June 9, 1925.  
A. A. JUELFS ET AL  
WAGON OR TRUCK DUMPING BODY  
Filed April 7, 1923     4 Sheets-Sheet 4

1,541,223

Inventors  
Allen A. Juelfs  
& Albert Juelfs

Witness  
J. Milton Jester

By  
D. A. Gorius  
Attorney

Patented June 9, 1925.

1,541,223

UNITED STATES PATENT OFFICE.

ALLEN A. JUELFS AND ALBERT JUELFS, OF McPHERSON, KANSAS.

WAGON OR TRUCK DUMPING BODY.

Application filed April 7, 1923. Serial No. 630,482.

*To all whom it may concern:*

Be it known that we, ALLEN A. JUELFS and ALBERT JUELFS, citizens of the United States, residing at McPherson, in the county of McPherson and State of Kansas, have invented certain new and useful Improvements in Wagon or Truck Dumping Bodies, of which the following is a specification.

This invention relates to vehicles, particularly to those of the type used in hauling materials of various kinds, and has for its object the provision of a novel wagon or truck body so constructed as to be readily dumped by the driver directly from the seat, means being provided for automatically opening the end gate to permit discharge of the contents of the body.

Another, and more specific, object is the provision of a dumping body of this character which is provided with spring latching means for normally holding it in its load receiving and carrying position, the latch being released to effect dumping merely by pulling upon a lever located in convenient reach of the driver without his leaving the seat.

Still another object is the provision of means for limiting the movement when the dumping is effected so as to prevent the rear end of the body from striking violently against the ground.

Yet another object is the provision of a novel means for mounting the frame of the body upon the chassis of a motor vehicle or running gear of a wagon.

An additional object is the provision of a structure of this character which will be very simple and inexpensive to manufacture, easy to control and operate, efficient and durable in service, and a general improvement in the art.

With the above and other objects and advantages in view, the invention consists in the details of construction to be hereinafter more fully described and claimed and illustrated in the accompanying drawings in which—

Figure 6 is a detail perspective view of the slotted guide bracket.

Figure 1:
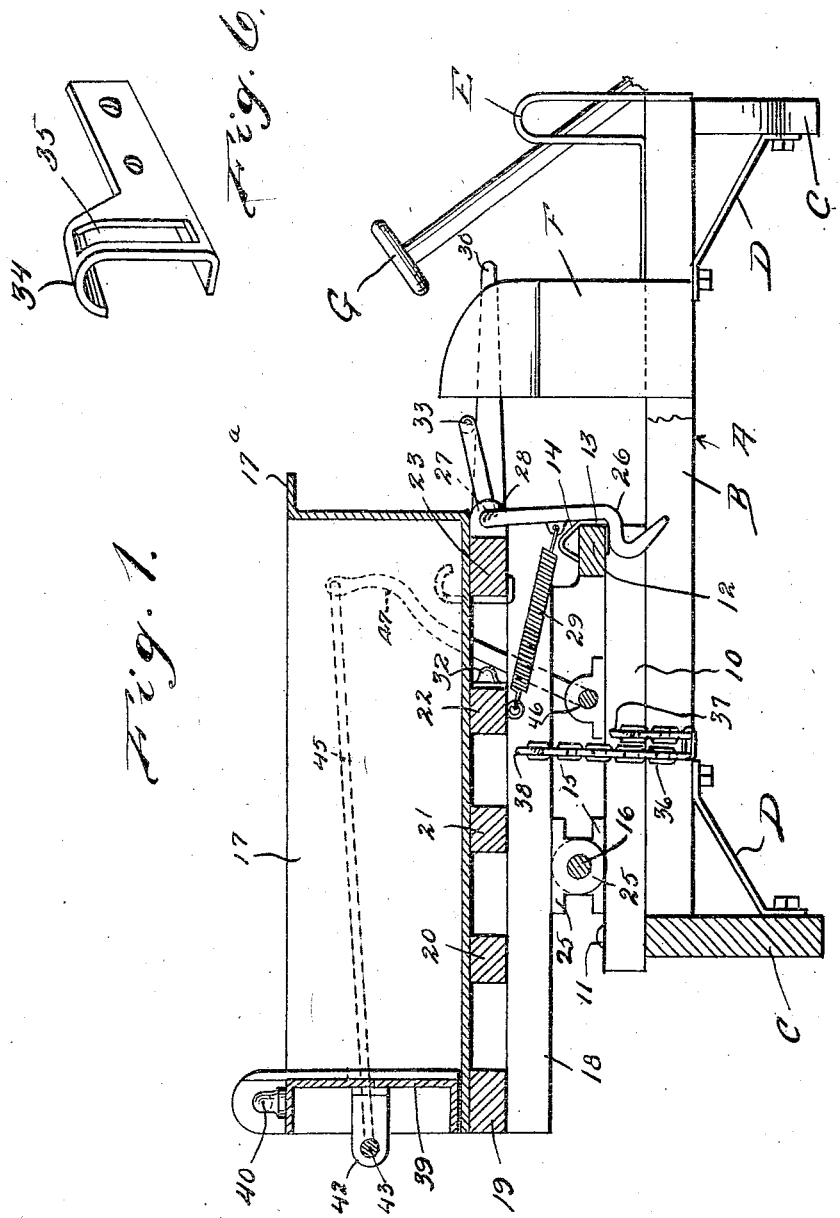
Figure 1 is a longitudinal section through a wagon body constructed in accordance with our invention, the body being shown in its normal position.

Referring more particularly to the drawings, the letter A designates broadly the main structure of a motor vehicle such as a truck or the like, or a wagon, and this frame is illustrated rather diagrammatically inasmuch as it is well known and forms no part of the present invention. Suffice it to say that this frame consists of longitudinal bars B connected at their forward and rear ends by cross members C strengthened by braces D. The letter E represents a superstructure on the forward end of the supporting frame which, in the case of a motor vehicle, would be a radiator, or which would be the dash in case of a wagon. Located back of the super-structure E is a suitable seat F for the driver and in the case of a motor vehicle there would naturally be provided a steering wheel G. The wheels and other parts of this main supporting structure are not disclosed as their application is obvious.

In carrying out our invention we provide an auxiliary frame which consists of longitudinal bars 10 bolted onto the frame bars B, as indicated at 11, and as illustrated, these bars 10 diverge rearwardly to to a slight extent though it is conceivable that they might be arranged in parallel relation. The forward ends of these bars 10 are connected by a cross bar 12 which carries a keeper 13 which may be formed from a single piece of sheet-metal of suitable gage or as a casting and which is located at the center of the cross bar 12. The upper end of this keeper is formed with an inclined surface 14 for a purpose to be described. Secured upon the bars 10 near the rear ends thereof are bearings 15 through which passes a shaft 16.

The movable portion of the device comprises a body proper 17 which may be and preferably is constructed of sheet-steel formed in any desired number of sections suitably secured together, and the upper edge of this body is preferably provided with an outwardly extending flange 17$^a$ which provides stiffness to prevent deformation of the body under even the most trying circumstances. This body is carried by a plurality of transverse sills which are in turn mounted upon a pair of longitudinal sills 18. The transverse sills are indicated by the numerals 19, 20, 21, 22 and 23. The body is strengthened and supported by brackets 24 which are secured thereto, as by rivets or the like, and which are bolted or otherwise secured to the cross bars or sills 19, 21 and 23, as shown. The undersides of the bars 18 carry bearings 25 through which the shaft 16 passes. By this construction it will be seen that the body proper is pivotally mounted with respect to the stationary frame.

Ordinarily the body is held in its horizontal or normal position by means of a hook-like latch 26 on one end of a rock shaft 27 which is journaled transversely of the body in bearings 28 secured on the forward edge of the cross sill 23. This latch 26 engages beneath the keeper 13 and is held in such active position by means of a coil spring 29 which has one end connected with the intermediate portion of the latch and which has its other end suitably mounted on the underside of the cross sill 22, or any other desired point. For effecting release of this latch there is provided an elongated lever 30 which is pivoted at 31 on a bracket 32 secured to the forward edge of the sill 22, and this lever is disposed beneath and is engaged by a laterally extending finger 33 on the rock shaft 27. For guiding the lever 30 in its movement and for limiting the extent of movement, we provide a slotted bracket 34 mounted on the rear edge of the sill 23 and formed with a slot 35 through which the lever 30 passes.

When the body has been moved to its dumping position by pulling upwardly upon the lever 30, it is desirable to provide means for limiting the tilting movement so that the rear end of the body will not strike forcibly upon the ground. This feature is carried out by the provision of chains 36 secured at their ends to eye bolts 37 and 38 extending through the bars 10 and 18, respectively.

The rear end of the body is normally closed by an end gate 39 of suitable detailed construction pivoted at its upper corners by means of trunnions 40 carried by the gate and journaled through standards 41 at the rear end of the body and also through the braces 24 at the rear end. Carried by the end gate are brackets 42 through which is rockably mounted a shaft 43 which has its ends flattened, as indicated at 44 and formed with holes through which pass the rear ends of rods 45 adjustably mounted by means of nuts 46 thereon engaging against opposite sides of the flattened ends 44.

To effect the automatic control of this end gate we provide bearings 46 mounted on the bars 10 and within which is journaled a substantially U-shaped member including arms 47 which are of compound curve shape and which have their free ends pivotally connected with the rods 45. These arms 47 extend between the cross sills 23 and 22. When the body is in its normal or horizontal position and latched, the brackets 32 on the forward edge of the cross member 22 engage against the arms and hold them in their forwardmost positions which naturally results in holding the end gate 39 in its closed position. When the body is moved into its dumping position, the arms 47 are engaged by the rear edge of the cross member 23 and are swung thereby to the rearmost limit of their movement which naturally causes the end gate to swing into vertical or depending or open position.

Figure 2:
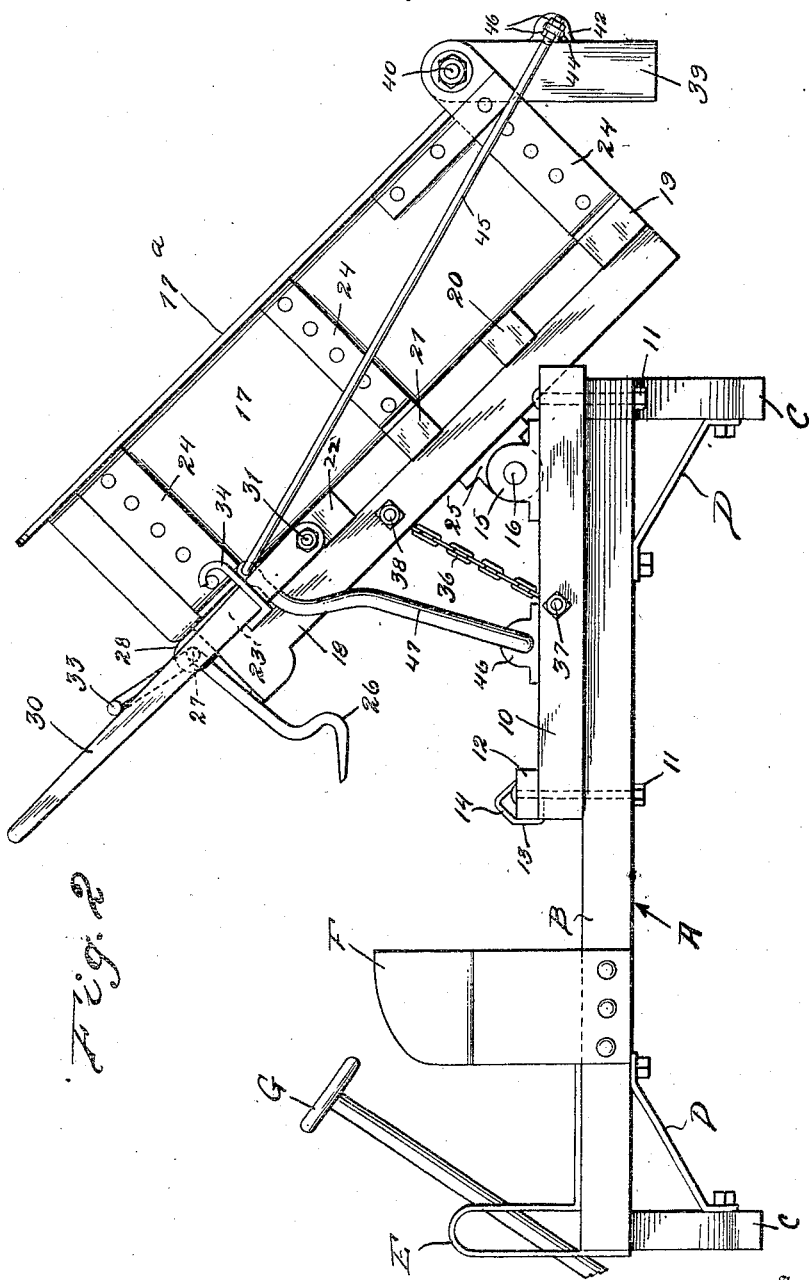
Figure 2 is an elevation showing the body in dumping position.
Figure 3:
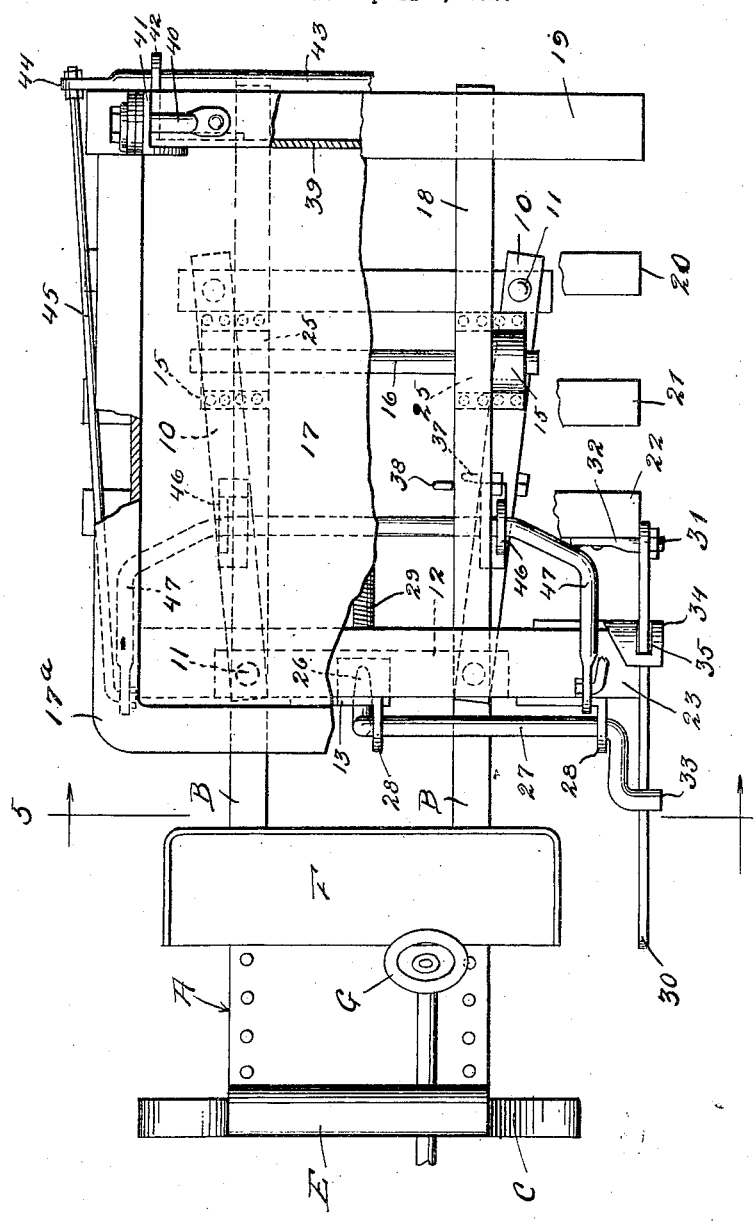
Figure 3 is a plan view with parts broken away and in section.
Figure 4:
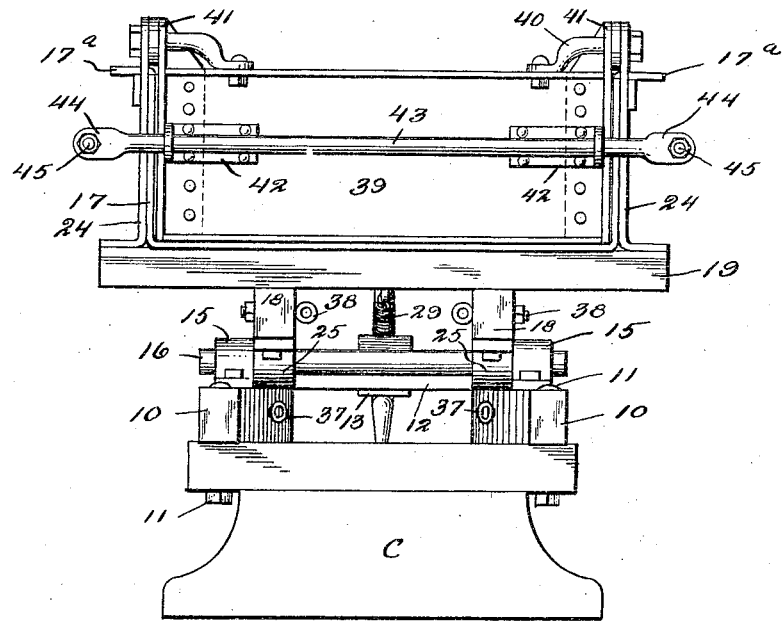
Figure 4 is a rear elevation.
Figure 5:
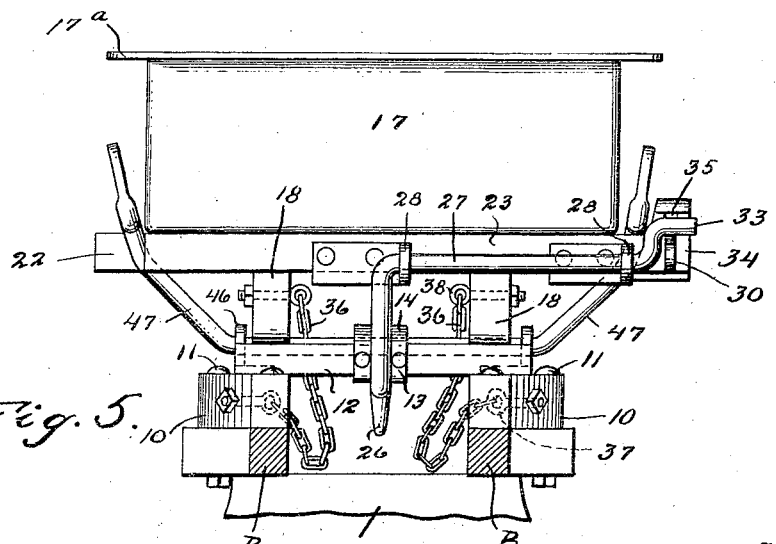
Figure 5 is a cross section on the line 5—5 of Figure 3.

Assuming that the device has been constructed and assembled as above described and as illustrated, it will be seen that the active or normal position is effectually maintained by the engagement of the latch 26 with the keeper 13 so that the body may be filled with sand, gravel, or other material which may be transported readily and without danger of accidental dumping. When dumping is desired, it is merely necessary that the operator on the seat F reach out to the side, grasp the lever 30 and pull upwardly thereon. The first result of this action is rocking movement of the shaft 27 and swinging of the latch 26 out of engagement with the keeper 13. The movement of the latch is limited by the engagement of the lever with the upper edge of the slot 35 in the bracket 34. When the release has been effected, slight additional upward pulling upon the lever will cause overbalancing of the load so that the body will swing or tilt upon the shaft 16 into its dumping position, as shown in Figure 2, the chains 36 becoming taut and serving as a check to limit the tilting movement. As the body tilts the engagement of the suitably shod rear edge of the front cross sill 23 with the arms 47 causes them to swing and to force the end gate 39 open through the instrumentality of the rods 45. To return the dumped body to normal position requires only a slight pull upon the lever 30 in a downward direction. The latch 26 upon engaging the inclined surface 14 of the keeper rides thereover and then snaps into place owing to the provision of the tension spring 29. At the same time the engagement of the brackets 32 on the cross sill 22 with the arms 47 swings them to forward position and closes the end gate.

From the foregoing description and a study of the drawings it will be apparent that we have thus provided a simply constructed and consequently inexpensive dumping body for wagons, truck, tractors, or any other wheel supported frame in which the act of dumping and restoring the body to normal position is accomplished with maximum ease and in a remarkably short time. The device is very readily constructed in such a manner as to be easily attached to already existing motor vehicle chasses or wagon running gears and may thus be manufactured and sold as a complete and separate entity. Owing to the fewness of the parts it is apparent that there is very little to get out of order and the structure should consequently have a long life.

While we have shown and described the preferred embodiment of our invention, it is of course to be understood that we reserve the right to make such changes in the form, construction and arrangement of parts as will not depart from the spirit of the invention or the scope of the subjoined claims.

We claim:

1. In a dumping vehicle, a stationary frame, a frame pivotally mounted thereon and carrying a body having a pivoted end gate, a hand lever pivoted on one side of the movable frame, a rock shaft journaled at the forward end of the movable frame and terminating in a latch, a keeper on the stationary frame cooperating with said latch to hold the body in normal position, an arm on said rock shaft in the path of travel of said lever, arms pivoted on the stationary frame and connected with the end gate, and means on the movable frame engageable with said arm when tilted whereby to open said end gate.

2. A dumping body attachment for vehicles comprising a stationary frame adapted to be secured upon the frame of a vehicle and carrying a keeper at its forward end, a movable frame pivoted upon and overlying said stationary frame, a body mounted on said movable frame and having its rear end open, an end gate pivoted at its upper corners at the rear end of the body, a hand lever pivoted upon one side of the movable frame, a rock shaft journaled upon the front of the movable frame and carrying a depending arm terminating in a latch normally spring-pressed into engagement with said keeper, said rock shaft having its other end terminating in a lateral arm formed with an extension located above and in engagement with said hand lever, a substantially U-shaped member journaled upon the stationary frame and including upstanding arms connected with said end gate, said arms being engageable by a portion of the movable frame upon tilting thereof whereby to swing the end gate into open position.

3. In a dump body attachment for vehicles, a stationary frame, bearings thereon at the rear ends thereof, a movable frame carrying depending bearings, a shaft passing through said bearings for pivotally mounting the movable frame, a body on the movable frame, a swingable end gate normally closing the rear end of the body, a latch on the movable frame cooperating with a keeper on the movable frame, a forwardly projecting hand lever on the movable frame operatively engaging said latch for releasing the same, and means engaging the movable frame and connected with the end gate whereby to swing the latter when the movable frame is tilted.

4. A dumping body attachment for vehicles comprising a stationary frame adapted to be secured upon a vehicle frame, a movable frame including longitudinal sills and a series of transverse bars, a body mounted upon said transverse bars, a pivotally mounted tail gate normally closing the rear end of the body, a hand lever pivoted on the movable frame, a latching mechanism for normally holding the movable frame in horizontal position, arms pivoted on the stationary frame having rod connections with the end gate, said arms being curved and normally engaging against the rear of the forwardmost transverse bar to be swung whereby when the movable frame is tilted, said arms being subsequently engageable by the forward edge of the next transverse bar to be returned to normal position when the movable frame is moved to horizontal position.

5. In a vehicle, a stationary frame, a movable frame carrying a body and pivoted intermediate its ends upon the stationary frame, a transverse member on said stationary frame, a transverse rock shaft journaled at the front of the movable frame and having a depending catch arm engaging normally beneath said transverse member, spring means for holding said catch device in engagement with the transverse member, a crank arm on said rock shaft terminating in a lateral extension, and a lever pivoted at one end upon the side of the movable frame and extending beneath and in engagement with said lateral extension whereby upon the application of upward pressure to the lever the rock shaft will be rocked to disengage the catch device whereby the movable frame may be tilted.

6. In a vehicle, a stationary frame, a movable frame carrying a body and pivoted intermediate its ends upon the stationary frame, a transverse member on said stationary frame, a transverse rock shaft journaled at the front of the movable frame and having a depending catch arm engaging normally beneath said transverse member, spring means for holding said catch device in engagement with the transverse member, a crank arm on said rock shaft terminating in a lateral extension, a lever pivoted at one end upon the side of the movable frame and extending beneath and in engagement with said lateral extension whereby upon the application of upward pressure to the lever the rock shaft will be rocked to disengage the catch device whereby the movable frame may be tilted, and a guide bracket mounted on one side of the movable frame and having an elongated slot through which the lever passes, the slot limiting swinging movement of the lever, and the upper end of the slot serving as an abutment for the lever whereby to permit application of force for tilting the body.

7. In a dumping body having an end gate pivoted at its upper end at the rear portion of the body, a U-shaped shaft journally supported, links pivotally connected with the ends of the arms of the U-shaped shaft and pivotally connected with the end gate, and stops on the body engageable with said arms for swinging the same to open the end gate when the body is tilted.

In testimony whereof we hereto affix our signatures.

ALLEN A. JUELFS.
ALBERT JUELFS.